United States Patent
Yan et al.

(10) Patent No.: US 7,974,315 B2
(45) Date of Patent: Jul. 5, 2011

(54) METHOD FOR IMPLEMENTING SYNCHRONIZATION OF LINK STATE DATABASE, ROUTER, LINE CARD AND MASTER BOARD

(75) Inventors: Gang Yan, Shenzhen (CN); Feng Yang, Shenzhen (CN); Cheng Sheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 12/261,221

(22) Filed: Oct. 30, 2008

(65) Prior Publication Data
US 2009/0116514 A1    May 7, 2009

(30) Foreign Application Priority Data

Oct. 31, 2007   (CN) .......................... 2007 1 0166419

(51) Int. Cl.
*H04J 3/06*   (2006.01)
(52) U.S. Cl. .................... 370/509; 370/503; 370/241
(58) Field of Classification Search .............. 370/241, 370/503–509
See application file for complete search history.

(56) References Cited

U.S. PATENT DOCUMENTS

| 6,529,481 B2* | 3/2003 | Akyol et al. ................ 370/250 |
| 7,155,535 B2* | 12/2006 | Agarwal et al. ............. 709/238 |
| 7,174,387 B1* | 2/2007 | Shand et al. ................ 709/238 |
| 7,269,133 B2* | 9/2007 | Lu et al. ..................... 370/219 |
| 7,424,035 B2* | 9/2008 | Saleh et al. ................. 370/468 |
| 7,457,277 B1* | 11/2008 | Sharma et al. .............. 370/351 |
| 2002/0191547 A1 | 12/2002 | Akyol et al. |

FOREIGN PATENT DOCUMENTS

| CN | 1494270 A | 5/2004 |
| CN | 1825836 A | 8/2006 |
| WO | WO 2009/067865 A2 | 6/2009 |

OTHER PUBLICATIONS

First Office Action in counterpart Chinese Application No. 200710166419.4, mailed Aug. 11, 2010.
Moy, J., "OSPF Version 2," Network Working Group, Apr. 1998.

* cited by examiner

*Primary Examiner* — Phuc Tran
(74) *Attorney, Agent, or Firm* — Leydig, Voit & Mayer, Ltd.

(57) ABSTRACT

A router is provided including a line card (LC), an active master board (AMB), a standby master board (SMB) and a LC for implementing a simple synchronization of a link state database (LSDB).

13 Claims, 6 Drawing Sheets

METHOD FOR IMPLEMENTING SYNCHRONIZATION OF LINK STATE DATABASE, ROUTER, LINE CARD AND MASTER BOARD

CROSS-REFERENCE TO RELATED APPLICATIONS

This application claims priority to Chinese Patent Application No. 200710166419.4, filed Oct. 31, 2007, entitled "Method for Implementing Synchronization of Link State Database, Router, Line Card and Master Board," the content of which is hereby incorporated by reference in its entirety.

FIELD OF THE INVENTION

The disclosure relates to communication field, more particularly, to a method for implementing synchronization of link state database, a router, a line card, and a master board.

BACKGROUND

The characteristic of current high-level routers is that the control and forwarding are separated. Generally speaking, the inner of a router may consist of an active master board (AMB), a standby master board (SMB), and a line card (LC). The AMB and the SMB both belong to the control plane, while the LC belongs to the forwarding plane. They are connected through a switch network. As shown in FIG. 1, it is a schematic view illustrating the structure of the conventional router. FIG. 1 shows routers A, B, and C. The process of transmitting a message from the router A to the router C is as follows: the LC 1 of the router B receives the message, e.g. a link state advertisement (LSA) message, sent from the router A; by looking up a forwarding table, when it is found out that the router C can be arrived by passing through the LC 2, the LC 1 transmits the message to the LC 2 by the switch network; and the LC 2 directly transmits the message to the router C. The AMB does not play any role in the forwarding process, and is only responsible for collecting routing information and issuing it to the LC. The LC is only responsible for rapidly forwarding the message. The LC can support different kinds of interfaces. The forwarding table on the LC is generated according to the routing information issued by the AMB.

The control plane running on the router consists of many routing protocols. The open shortest path first (OSPF) protocol is the most widely used one. The OSPF protocol is run to store all the neighbors with the state of Full into the link state advertisement (LSA) message as link information. By the reliable transmission of the protocol, all the routers on the network may include exactly the same link state database (LSDB) and all the routers may use the same arithmetic. The routing with no loops may be obtained by calculating the same LSDB.

Currently, with regard to the application of router, there exists a non-stop routing (NSR) technique. In other words, in order to increase usability of the router, key boards (commonly, master boards) are backuped in the way of 1+1, i.e. they are stored in the AMB and the SMB. Under normal circumstances, the AMB works and the SMB dose not work. When a failure occurs, the AMB may be restarted by switching. At the same time, the SMB becomes the AMB so as to reduce the influence of the failure to the service as much as possible. If switching time is expected to be short as much as possible, the SMB needs to store the data of the AMB as much as possible. The data includes the LSDB needed for generating routing. At the moment, the LSDB stored by the SMB is required to be synchronized with the LSDB before switching as much as possible. After the switching occurs, the SMB obtains a new routing table by calculating according to the existing LSDB, so as to prevent the switching process from affecting the neighbor or the amount of service flows.

Regarding the NSR technique, one solution for implementing synchronization of the LSDB is as follows: after the LC receives a LSA message, the LC transmits the LSA message to the AMB and the SMB, simultaneously. After the SMB receives the LSA message, the SMB does not process the LSA message temporarily but caches and stores the LSA message. After the AMB receives the LSA message, the AMB starts to process the LSA message and transmits the processing result of each LSA message to the SMB. The SMB processes the cached LSA message, according to the processing result of the AMB. Therefore, when the switching occurs, after the SMB becomes a new AMB, the SMB could know that all the cached messages may not be processed by the original AMB, and the new AMB may continue to process these cached LSA messages.

Although the above mentioned technique can implement synchronization of the LSDB, it is complicated. For example, there is a need to encode all the processing manner of the LSA message for management and perform backup for all the places where the LSA message performs branch processing. All modifications for processing the LSA message, e.g. modification of codes and so on, may affect the final characteristic of implementing the NSR.

SUMMARY

The embodiments of the disclosure provide a method for implementing synchronization of LSDB, a router, a LC, and an AMB. They can implement the synchronization of the LSDB simply.

An embodiment of the disclosure provides a method for implementing synchronization of LSDB, including:
  receiving a LSA message;
  comparing the LSA message with a LSA message in a LSDB; updating the LSA message in the LSDB when recognizing that the LSA message received is a new message by comparing; and transmitting the LSA message received to a virtual neighbor which has established virtual neighborhood.

An embodiment of the disclosure provides a router, including:
  a LC adapted to receive a LSA message, compare the LSA message received with a LSA message in a LSDB, update the LSA message in the LSDB when recognizing the LSA message received is a new message by comparing, and transmit the LSA message received to an AMB and a SMB;
  an AMB adapted to receive the LSA message sent by the LC, compare the LSA message received with the LSA message in the LSDB, update the LSA message in the LSDB when recognizing that the LSA message received is a new message by comparing, and transmit the LSA message received to the SMB and other LCs except the LC of a transmitting party; and
  a SMB adapted to receive the LSA message sent by the LC or the AMB which has established virtual neighborhood.

An embodiment of the disclosure provides a LC adapted to receive a LSA message, compare the LSA message received with a LSA message in a LSDB, update the LSA message in the LSDB when recognizing the LSA message received is a new message by comparing, and transmit the LSA message received to an AMB and a SMB; and An embodiment of the disclosure provides an AMB adapted to receive the LSA message sent by the LC, compare the LSA message received with the LSA message in the LSDB, update the LSA message in the LSDB when recognizing that the LSA message received is a new message by comparing, and transmit the LSA message received to the SMB and other LCs except the LC of a transmitting party.

The embodiments of the disclosure include: receiving a LSA message; comparing the LSA message with a LSA message in an LSDB, updating the LSA message in the LSDB when recognizing that the LSA message received is a new message by comparing, and transmitting the LSA message received to a virtual neighbor which has established virtual neighborhood. In the technical solution of embodiments of the disclosure, the virtual neighborhood has already been established between component units in the router and the LSDB has been distributedly stored. After receiving the LSA message, a step of comparing with the stored LSA message is added. Only when it is recognized by comparing that the received LSA message is a new LSA message, will the LSA message be sent to the virtual neighbor which has established virtual neighborhood. Therefore, the synchronization of the LSDB is simply implemented by adopting the LSDB synchronization mechanism of the OSPF protocol's own, which greatly reduces the amount of message flow inside the router.

DETAILED DESCRIPTION

Figure 1:
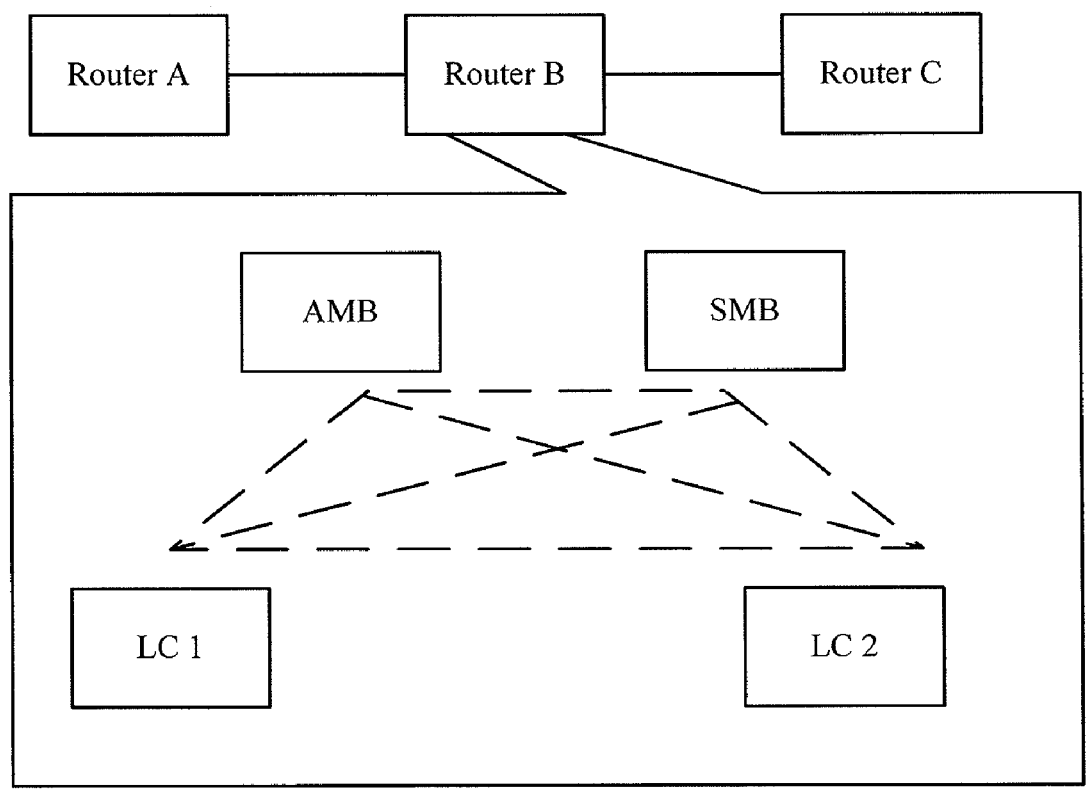
FIG. 1 is a schematic view illustrating the structure of a conventional router.

The embodiments of the disclosure provide a method for implementing the synchronization of LSDB. This method can implement the synchronization of LSDB simply and has strong expandability.

When the OSPF protocol is running, there exists a designated router (DR), a backup designated router (BDR) and a non-designated router (DR Other). The DR and the BDR need to be elected in network. Once the DR has failure, the BDR as a backup of the DR may turn to be a DR so that the network can continue working. Compared with the DR and the BDR, other non-DRs and non-BDRs all can be called DR Other.

In the method of embodiments of the disclosure, the AMB is taken as the DR, the SMB is taken as the BDR, and the LC is taken as the DR Other. In other words, each of the AMB, SMB and LC inside the router is taken as a single router. They form virtual neighborhood and perform the synchronization of the LSDB in accordance with a synchronization mechanism of the OSPF protocol. At this moment, without election by the DR and the BDR, the AMB may be directly considered as the DR and the SMB may be directly considered as the BDR. Alternatively, the AMB is taken as the BDR and the SMB is taken as the DR. However, the LC should be taken as the DR Other. In addition, the actual interface state and the neighbor state with an outer router are also processed by the LC. The AMB may generate a LSA message but the SMB does not generate any LSA message. With regard to the DR, the DR forms virtual neighborhood with each LC, the interface state and the neighbor state between the DR and the outer router are obtained from the LC, and the related configuration is directly backuped into the BDR. With regard to the BDR, similar to the DR, the BSR forms virtual neighborhood with the LC, and the interface state and the neighbor state between the DR and the outer router are obtained from the LC. With regard to the DR Other, each LC may be called the DR Other. The LC preserves a complete link state database (LSDB) in local. This LSDB is a universal set of the LSDB sent to the LC from all the virtual neighbors associated with the LC. In prior art, the LSDB is stored in the MB. In the method in accordance with embodiments of the disclosure, the LSDB is also stored in the LC, that is, the LSDB is distributed in different LCs. Each of LCs stores the related part of the LSDB, and then transmits it to the AMB and the SMB for collection. Therefore, the LSDB may be called distributed LSDB. Only after the LC received the updated LSA message, it transmits the LSA message to the DR and the BDR.

In the embodiments of the disclosure, each of the AMB, SMB, and LC inside the router is regarded as a single virtual router, and they form virtual neighborhood. Therefore, there is a need to create a virtual interface on the MB (including the AMB and the SMB) and the LC, respectively, and establish the virtual neighborhood. Concerning the actual interface state and neighbor state with the outer router, they may be established with the outer router via the LC. The specific process is similar to the original process of establishment with the outer router via the MB except the process is implemented by the LC instead. Therefore, unnecessary details will not be described here. Accordingly, the LC may manage the virtual interface and the virtual neighborhood with the AMB and the SMB and the interface and neighborhood with the outer router and the LC at the same time. The virtual neighborhood established between the MB and the LC is created following rules of the OSPF protocol. There may be two manner. The first manner is to implement the establishment of the virtual neighborhood by using the process of neighbor establishment stipulated by the protocol. The MB and the LC transmit Hello messages (OSPF neighbor discovery messages) mutually. After receiving the Hello message, the MB and the LC transmit DD messages (OSPF database description messages) mutually and request opposite party to transmit the LSA message needed according to the DD messages, so as to create the virtual neighbor in Full state. The second manner omits the process of transmitting the Hello messages and the DD messages. The MB and the LC may directly get to know the existence of the opposite party according to the provided device management information, and directly transmit the LSA message mutually, so as to create the virtual neighbor in Full state.

Each manner for creating the virtual neighbor mentioned above needs a virtual interface corresponding to the LC or the MB to be set for every area. For example, if there are 500 areas on one LC, the LC and the MB both need to create a corresponding virtual interface for each area. Too many virtual interfaces may cause the ASE LSA message (the fifth-type LSA message) flood all over the virtual interfaces, which results in a certain waste. Therefore, it may be further optimized. Not every area has a set of virtual interfaces created corresponding to the LC and the MB. Instead, only one virtual interface which can process the messages in all areas is created on the LC or the MB. It should be noted that, in the method of the embodiments of the disclosure, the valid LSA message (e.g. the ninth-type LSA message) in the local interface needs to be switched by the MB and the LC, but no longer forwarding of the valid LSA message after being received by the interface, according to the OSPF protocol, needs to be avoided because the conventional LSDB is directly stored in the MB and the LC in the embodiments of the disclosure needs to synchronize its own LSDB to the LSDB on the MB.

The process of implementing the synchronization of the LSDB between the MB and the LC by using the characteristic of the OSPF protocol in the method of the embodiments of the disclosure is described in detail as follows.

Figure 2:
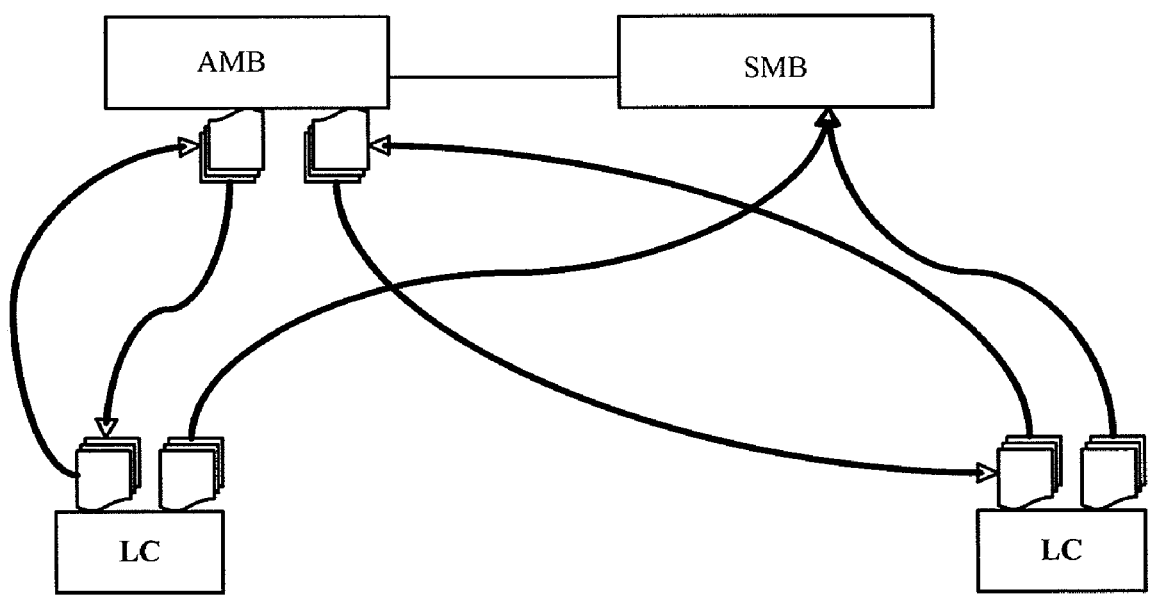
FIG. 2 is a schematic view illustrating the process of the synchronization of the LSDB between the MB and the LC, in accordance with an embodiment of disclosure.

As shown in FIG. 2, it is a schematic view illustrating the process of the synchronization of the LSDB between the MB and the LC, in accordance with an embodiment of disclosure. As shown in FIG. 2, the synchronization is ensured through a retransmission mechanism between the AMB and the LC. There are many retransmission queues (each retransmission queue corresponds to one LC) on the AMB. There are two retransmission queues (the two retransmission queues correspond to the AMB and the SMB) on the LC. Regarding the SMB, it only receives the LSA message sent by the AMB or the LC and returns an acknowledgement (ACK) message with no LSA message generated. There is difference among the OSPF protocols running on the AMB, the SMB, and the LC. The AMB may generate a new LSA message, which performs aging and refreshment of the LSA message. The SMB and the LC do not perform the aging and refreshment of the LSA message, and maintain their own LSDB by the AMB. The routing calculation is only performed on the AMB, but not on the SMB and the LC.

The LC synchronizes its own LSDB to the AMB and the SMB. After the LC receives a LSA message, the LC performs comparison between the received LSA message and the LSA message in the LSDB stored in the LC itself to recognize whether it is new or old. The above mentioned comparison may be performed, according to a conventional arithmetic in the OSPF standard protocol. For example, the comparison may be performed according to the sequence number, checksum, or age of the LSA message. The message with greater sequence number, greater checksum, or greater age is the new message. The messages with contrary condition are the old message. When the received LSA message is old or the same, it is processed according to the protocol. When the received LSA message is new, it is used to update the stored LSA message. The new LSA message is packed as the size of MTU (IP Maximum Transmission Unit) and the packed LSA message is added into the retransmission queue sent to the AMB and the SMB. The new LSA message is sent to the AMB and the SMB in a way of multi-broadcasting. After the LC receives the ACK message returned by the AMB and the SMB, the LC deletes the LSA message in the corresponding retransmission queue. After the AMB receives the LSA message, the AMB also compares it with the LSA message in the LSDB stored by itself to recognize whether it is new or old. If the received LSA message is the same LSA message, the AMB returns the ACK message to the LC. If the received LSA message is a new LSA message, the AMB updates the stored LSA message and transmits the new LSA message to other interface boards (including the SMB and other LC). If the received LSA message is an old LSA message, the AMB transmits the stored new LSA message to the LC. The AMB transmits the LSA message to the LC (including the LC of the transmitting party and other LCs) also through a retransmission queue. It can be seen that, this mechanism can totally ensure the synchronization of the distributed LSDB.

Taking the situation that the LC receives the LSA message and synchronizes the LSDB to the virtual neighbor as an example, the detail is explained as follows.

Figure 3:
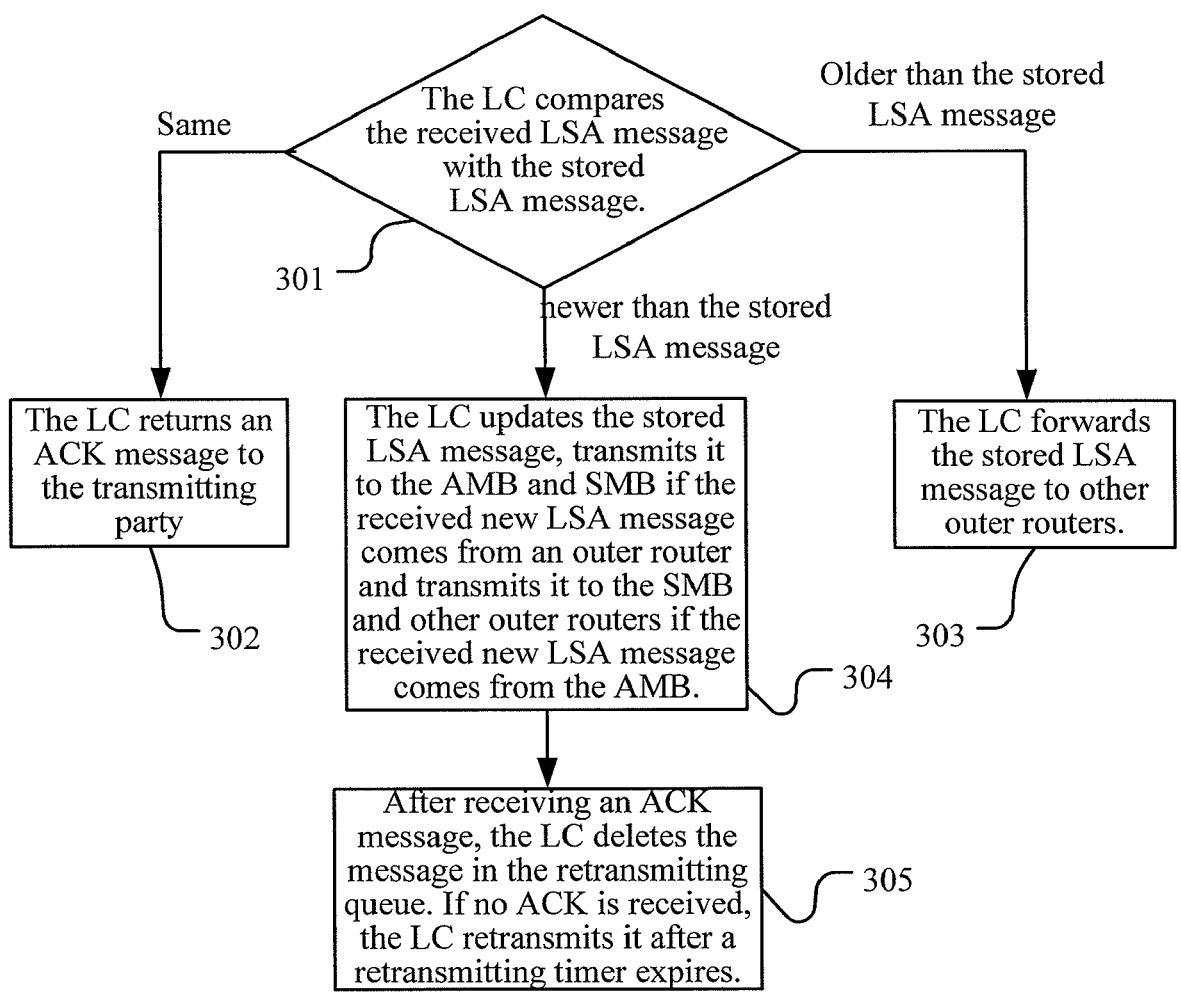
FIG. 3 is a flow chart illustrating the process that the LC receives the LSA message and synchronizes the LSDB to the virtual neighbor, in accordance with an embodiment of the disclosure.

As shown in FIG. 3, it is a flow chart illustrating the process that the LC receives the LSA message and synchronizes the LSDB to the virtual neighbor, in accordance with an embodiment of the disclosure, including the following steps:

Step 301: The LC compares the received LSA message with the stored LSA message in the LSDB. If the received LSA message is the same as the stored LSA message, Step 302 is executed. If the received LSA message is older than the stored LSA message, Step 303 is executed. If the received LSA message is newer than the stored LSA message, Step 304 is executed.

It should be noted that the LSA message received by the LC may be sent by an outer router or by an AMB.

Step 302: The LC returns an ACK message to the transmitting party.

Step 303: The LC forwards the stored LSA message to other outer routers.

Step 304: The LC updates the stored LSA message. If the received new LSA message is sent by the outer router, the LC adds the new LSA message into a virtual neighbor retransmission queue of the corresponding AMB and SMB. The LC may transmit the new LSA message to the AMB and the SMB in a way of multi-broadcasting. If the received new LSA message is sent by the AMB, the LC may transmit the new LSA message to the SMB and other outer routers in the way of multi-broadcasting, and Step 305 is executed.

When the LSA message is sent to the AMB or the SMB, the LSA message is packed as the size of a MTU and the packed LSA message is added into the retransmission queue sent to the AMB and the SMB. The message headers of the ASE LSA message (the fifth-type LSA message) and the Opaque10 LSA message (the tenth-type LSA message) contain process numbers. The message headers of the Router LSA message (the first-type LSA message), the Network LSA message (the second-type LSA message), and the Summary LSA message (the third-type LSA message) contain process numbers and area numbers. The LSA messages in interface scope also contain interface indexes.

Step 305: After the LC receives the ACK message of the AMB, the LC deletes the LSA message in the corresponding retransmission queue. After receiving the ACK message of the SMB, the LC deletes the LSA message in the corresponding retransmission queue. If the LC does not receive the ACK message of the AMB or the SMB, the LC retransmits the LSA message in the corresponding retransmission queue to the corresponding AMB or SMB in a way of unicasting, after a retransmission timer expires.

In addition, when the interface state or the neighbor state between the LC and the outer router is changed, the LC notifies the AMB and the SMB so as to enable the AMB and the SMB to acquire the newest interface state or neighbor state.

Taking the situation that the AMB receives the LSA message and synchronizes the LSDB to the virtual neighbor as another example, the detail is described as follows.

Figure 4:
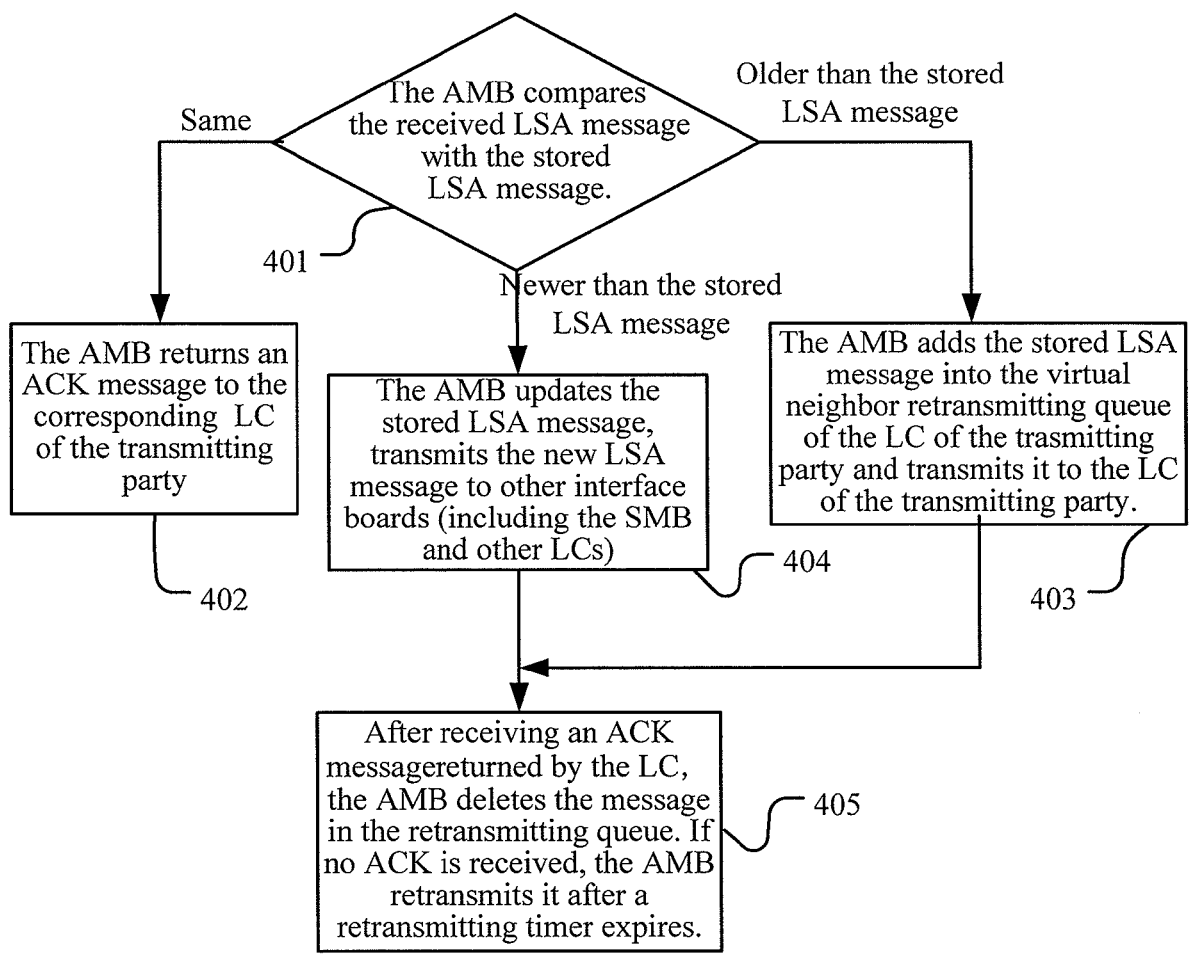
FIG. 4 is a flow chart illustrating the process that the AMB receives the LSA message and synchronizes the LSDB to the virtual neighbor, in accordance with an embodiment of the disclosure.

As shown in FIG. 4, it is a flow chart illustrating the process that the AMB receives the LSA message and synchronizes the LSDB to the virtual neighbor, according to an embodiment of the disclosure, including following steps:

Step 401: The AMB compares the received LSA message with the LSA message in the LSDB stored. If the received LSA message is the same as the stored LSA message, Step 402 is executed. If the received LSA message is older than the stored LSA message, Step 403 is executed. If the received LSA message is newer than the stored LSA message, Step 404 is executed.

Step 402: The AMB returns an ACK message to the LC of the corresponding transmitting party.

Step 403: The AMB adds the stored LSA message to the virtual neighbor retransmission queue of the corresponding LC of the transmitting party, transmits the stored LSA message to the LC of the transmitting party, and executes Step 405;

Step 404: The AMB updates the stored LSA message, transmits the new LSA message to other interface boards (including the SMB and other LCs), and executes Step 405.

The AMB also adds the new LSA message into the virtual neighbor retransmission queue of other LCs and transmits the new LSA message to other LCs, except the LC of the transmitting party.

Step 405: After the AMB receives the ACK message returned by the LC, the AMB deletes the LSA message in the corresponding retransmission queue. If the AMB does not receive the ACK message returned by the LC, the AMB retransmits the LSA message in the corresponding retransmission queue to the corresponding LC after the retransmission timer expires.

It should be noted that, after the AMB generates a new LSA message, the AMB directly transmits the new LSA message to the SMB and all the LCs. When the new LSA message is sent to the LC, the LSA message is added into the virtual neighbor retransmission queue of the corresponding LC and sent to the LC. If the AMB receives the ACK message returned by the LC, the AMB deletes the LSA message of the corresponding retransmission queue. If the AMB does not receive the ACK message returned by the LC, the AMB retransmits the LSA message in the corresponding retransmission queue to the corresponding LC, after the retransmission timer expires.

The introduction mentioned above is for the processes that the LC and the AMB receive the LSA message and synchronize the LSDB to the virtual neighbor, respectively. With regard to the SMB, it only receives and stores the LSA message, and then returns the ACK message to the transmitting party, but the SMB does not transmit out the LSA message. The LC does not transmit the received LSA message to the AMB and the SMB unless the received LSA message is new. The AMB also does not transmit the received LSA message to the SMB and other LCs unless the received LSA message is new. Alternatively, when the AMB generates a new LSA message, the AMB directly transmits the new LSA message to the SMB and all the LCs. Therefore, generally speaking, all the LSA messages received by the SMB are new. What the SMB needs to do is just to receive and store the LSA messages, and then return the ACK message to the transmitting party.

It should be noted that, if a SMB is newly inserted, the SMB creates a virtual interface and a virtual neighbor corresponding to the AMB and the LCs, and takes the AMB as the DR. Then, all the LCs and AMB start to transmit its own LSA messages to the SMB. If a LC is newly inserted, the LC creates a virtual interface and a virtual neighbor corresponding to the AMB and the SMB, and takes the AMB as the DR. Then, the AMB and the SMB start to transmit all the LSA messages to the LC. In addition, the newly inserted LC establishes a neighborhood with the outer router. Because the virtual neighbor and the virtual interface are established between the LC and the MB, once a new LC is inserted, the MB and the LC can both obtain the processing functions of the corresponding virtual neighbor. In addition, the actual interface state and the neighbor state with the outer router may be also implemented via the LC so that if each LC can support 100 neighbors, 10 LCs can support 1000 neighbors accordingly. Therefore, the expandability is good.

The synchronization of the LSDB performed in accordance with the above manner can guarantee the synchronization of the LSDB between the AMB, the SMB, and the LC, which can greatly reduce the amount of message flow between the AMB, the SMB, and the LC. Because the LSDB is stored on the LC, no matter in the process of establishing the neighbor or in the process of synchronizing the LSDB, the AMB needs to participate in the processing only when a LSA message newer than on the LC is processed or a newer LSA message is required. After receiving the same or the old LSA message or a request, the LSA message can be processed independently on the LC without participation of the AMB. The method in accordance with the embodiments of the disclosure fully takes advantage a LSDB synchronization mechanism of the OSPF's own so that the method can be implemented simply and reliably.

When a switching occurs and the SMB is taken as an AMB, the LC takes the new AMB as the DR. Because each LC stores the LSDB by itself in the method in accordance with embodiments of the disclosure, after the switching, the new AMB may directly obtain the LSDBs on all the LCs. Besides, after the switching occurs, the switching of the AMB will not cause any change for the neighbor state on the LC because the interface state and the neighbor state are stored by the LC. Therefore, the new AMB may directly obtain the interface state and the neighbor state on each of LCs. Therefore, the new AMB may obtain the LSDB and the relationship between the interface state and the neighbor state on the LC from the LC and implement synchronization of the LSDB after switching. Then, the new AMB performs routing calculation once, according to the LSDB and the neighborhood, and then updates the routing table.

It should be noted that, the above content is explained as an example under a situation of 1+1 backup, i.e. one AMB and one SMB. Under a situation of 1+N backup, i.e. one AMB and N SMBs, the content may also be implemented simply because the SMB does not generate any LSA message. The principle is the same only by regarding all the SMBs as the BDRs.

It should be further explained that the methods in accordance with the embodiments of the disclosure take the running of the OSPF protocol as an example, but should not be limited to it. Besides, the methods may also be adopted in other protocols for example in an Intermediate System to Intermediate System (IS-IS) protocol, which is quite similar to the OSPF protocol.

The methods for implementing the synchronization of the LSDB in accordance with the embodiments of the disclosure are described in more detail as the above mentioned. Correspondingly, an embodiment of the disclosure provides a router.

Figure 5:
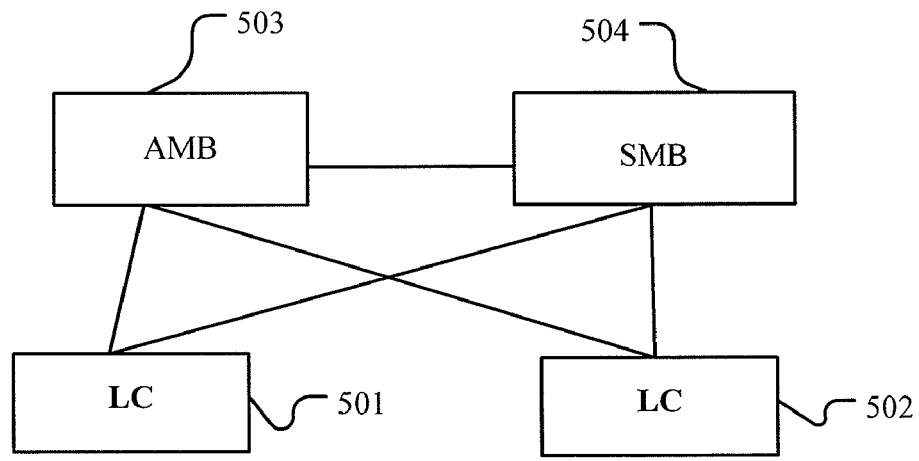
FIG. 5 is a schematic view illustrating the structure of the router, in accordance with an embodiment of the disclosure.

As shown in FIG. 5, it is a schematic view illustrating the structure of the router, in accordance with the embodiment of the disclosure.

As shown in FIG. 5, the router includes a LC 501, a LC 502, an AMB 503, and a SMB 504. It should be noted that two LCs are only taken as an example in FIG. 5.

In the embodiment of the disclosure, the AMB is taken as the DR, the SMB is taken as the BDR and the LC is taken as the DR Other; in other words, each of the AMB, SMB, and LC inside the router is taken as one single router. They form a virtual neighborhood, and perform the synchronization of the LSDB, according to the synchronization mechanism of the OSPF protocol. At this moment, there is no need to elect the DR and the BDR. The AMB may be directly taken as the DR, and the SMB may be directly taken as the BDR. Alternatively, the AMB may be taken as the BDR, and the SMB may be taken as the DR. However, the LC should be taken as the DR Other.

The LC is adapted to receive the LSA message, compare the received LSA message with the LSA message in the LSDB stored, update the LSA message in the LSDB stored when recognize that the received LSA message is a new message by comparing, and transmit the received LSA message to the AMB 503 and the SMB 504.

The AMB 503 is adapted to receive LSA message sent by the LC, compare the received LSA message with the LSA message in the LSDB stored, update the LSA message in the LSDB stored when recognize that the received LSA message is a new message by comparing, and transmit the received LSA message to the SMB 504 and other LCs, except the LC of the transmitting party.

The SMB 504 is adapted to receive the LSA message sent by the virtual neighbor LC or the AMB 503, which has established the virtual neighborhood.

Figure 6:
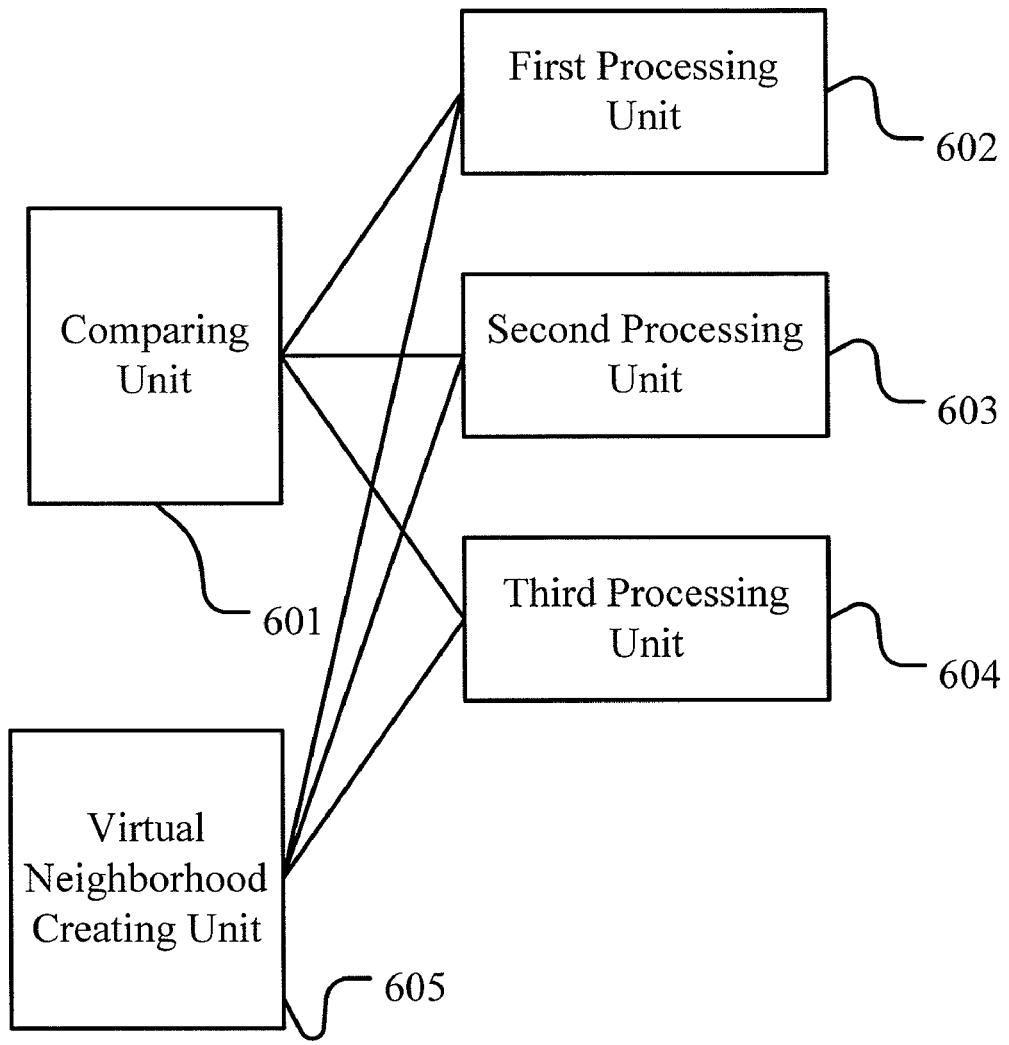
FIG. 6 is a schematic view illustrating the structure of the LC in the router, in accordance with an embodiment of the disclosure.

As shown in FIG. 6, it is a schematic view illustrating the structure of the LC in the router, according to an embodiment of the disclosure.

The LC includes a comparing unit 601, a first processing unit 602, a second processing unit 603, a third processing unit 604, and a virtual neighborhood creating unit 605.

The comparing unit 601 is adapted to compare the receive LSA message with the LSA message stored in the LSDB, after receiving the LSA message. The LSA message received by the comparing unit 601 may be sent by other routers or by the AMB of the present router.

The first processing unit 602 is adapted to update the LSA message in the LSDB stored after the comparing unit 601 recognizes that the LSA message received is a new message by comparing, transmit the received LSA message to the AMB and the SMB if the received new LSA message is sent by the outer router, and transmit the received LSA message to the SMB and other outer routers in the way of multi-broadcasting if the received new LSA message is sent by the AMB. The first processing unit 602 of the LC transmitting the received LSA message to the AMB and the SMB specifically includes: adding the received LSA message into the retransmission queue of the corresponding AMB and SMB, and transmitting the received LSA message to the AMB and the SMB in the way of multi-broadcasting; if a returned ACK message is received, deleting the LSA message in the corresponding retransmission queue; if no returned ACK message is received, retransmitting the LSA message in the corresponding retransmission queue in the way of unicasting after the retransmission timer expires.

The second processing unit 603 is adapted to transmit the LSA message in the LSDB stored to other routers, after the comparing unit 601 recognizes that the received LSA message is an old message by comparing.

The third processing unit 604 is adapted to return an ACK message to the transmitting party, after the comparing unit 601 recognizes that the LSA message received is a same message by comparing.

The virtual neighborhood creating unit 605 is adapted to create a virtual interface and establish virtual neighborhood with the AMB 503 and the SMB 504 via the virtual interface.

Figure 7:
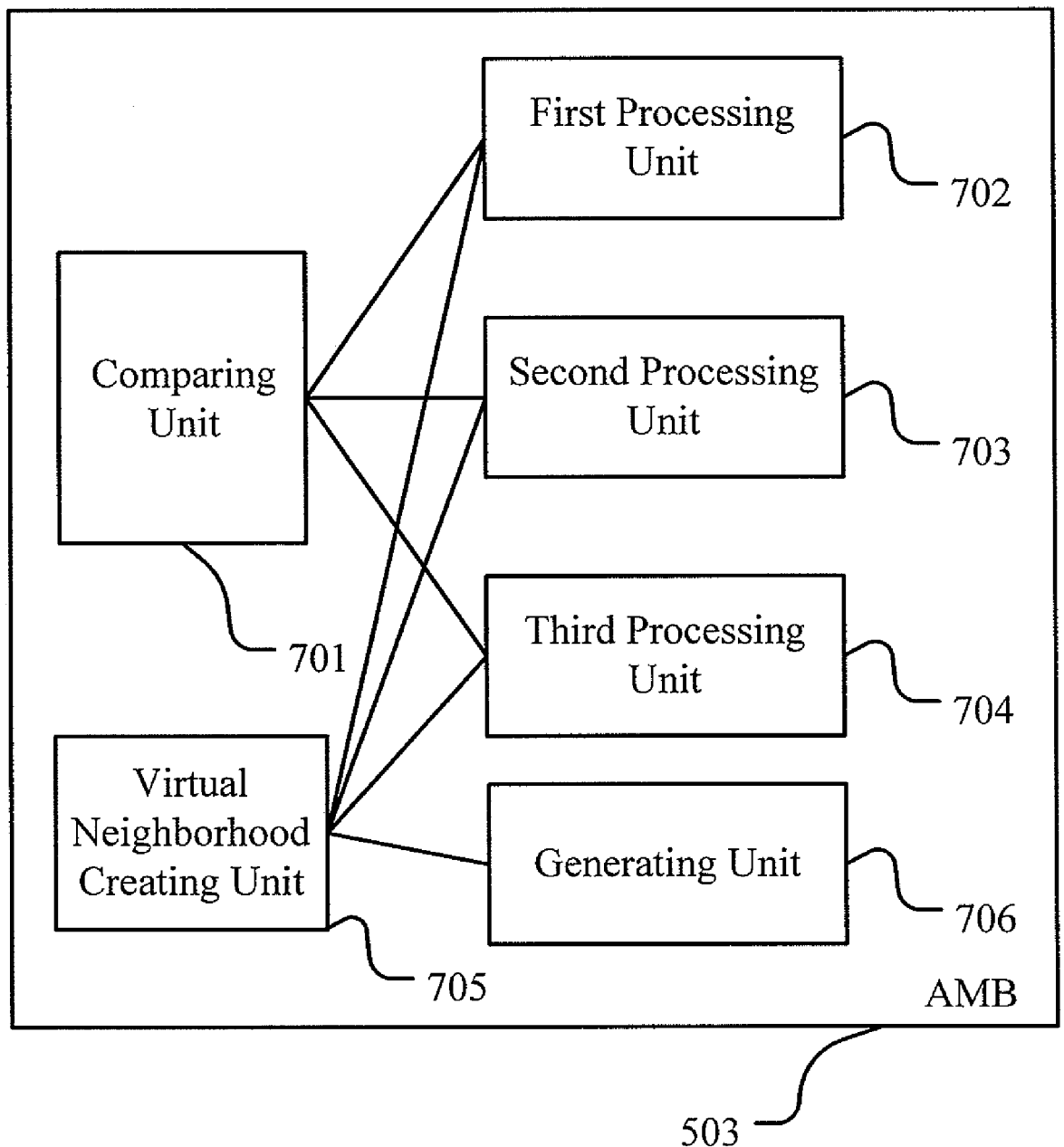
FIG. 7 is a schematic view illustrating the structure of the AMB in the router, in accordance with to an embodiment of the disclosure.

As shown in FIG. 7, it is a schematic view illustrating the structure of the AMB in the router, according to an embodiment of the disclosure.

The AMB 503 includes a comparing unit 701, a first processing unit 702, a second processing unit 703, a third processing unit 704, and a virtual neighborhood creating unit 705.

The comparing unit 701 is adapted to compare, after receiving the LSA message sent by the LC, the received LSA message with the LSA message in the LSDB stored.

The first processing unit 702 is adapted to update the LSA message in the LSDB stored when the comparing unit 701 recognizes that the LSA message received is a new message by comparing, and transmit the received LSA message to the SMB and other LCs, except the LC of the transmitting party.

The second processing unit 703 is adapted to transmit the LSA message in the LSDB stored to the LC of the transmitting party, when the comparing unit 701 recognizes that the LSA message received is an old message by comparing.

The first processing unit 702 or the second processing unit 703 of the AMB transmitting the LSA message to the LC specifically includes: adding the LSA message into the retransmission queue of the corresponding LC and transmitting the LSA message to the LC; if a returned ACK message is received, deleting the LSA message in the corresponding retransmission queue; and if no returned ACK message is received, retransmitting LSA message in the corresponding retransmission queue after the retransmission timer expires.

The third processing unit 704 is adapted to return an ACK message to the LC of the transmitting party, when the comparing unit 701 recognizes that the LSA message received is a same message by comparing.

The virtual neighborhood creating unit 705 is adapted to create a virtual interface and establish the virtual neighborhood with the LC and the SMB 504 via the virtual interface.

The AMB 503 further includes a generating unit 706.

The generating unit 706 is adapted to generate a LSA message and transmit the LSA message generated to the SMB and all the LCs. The transmission to the LC specifically includes: adding the LSA message into the retransmission queue of the corresponding LC and transmitting the LSA message to the LC; if a returned ACK message is received, deleting the LSA message in the corresponding retransmission queue; if no returned ACK message is received, retransmitting the LSA message in the corresponding retransmission queue after the retransmission timer expires.

Figure 8:
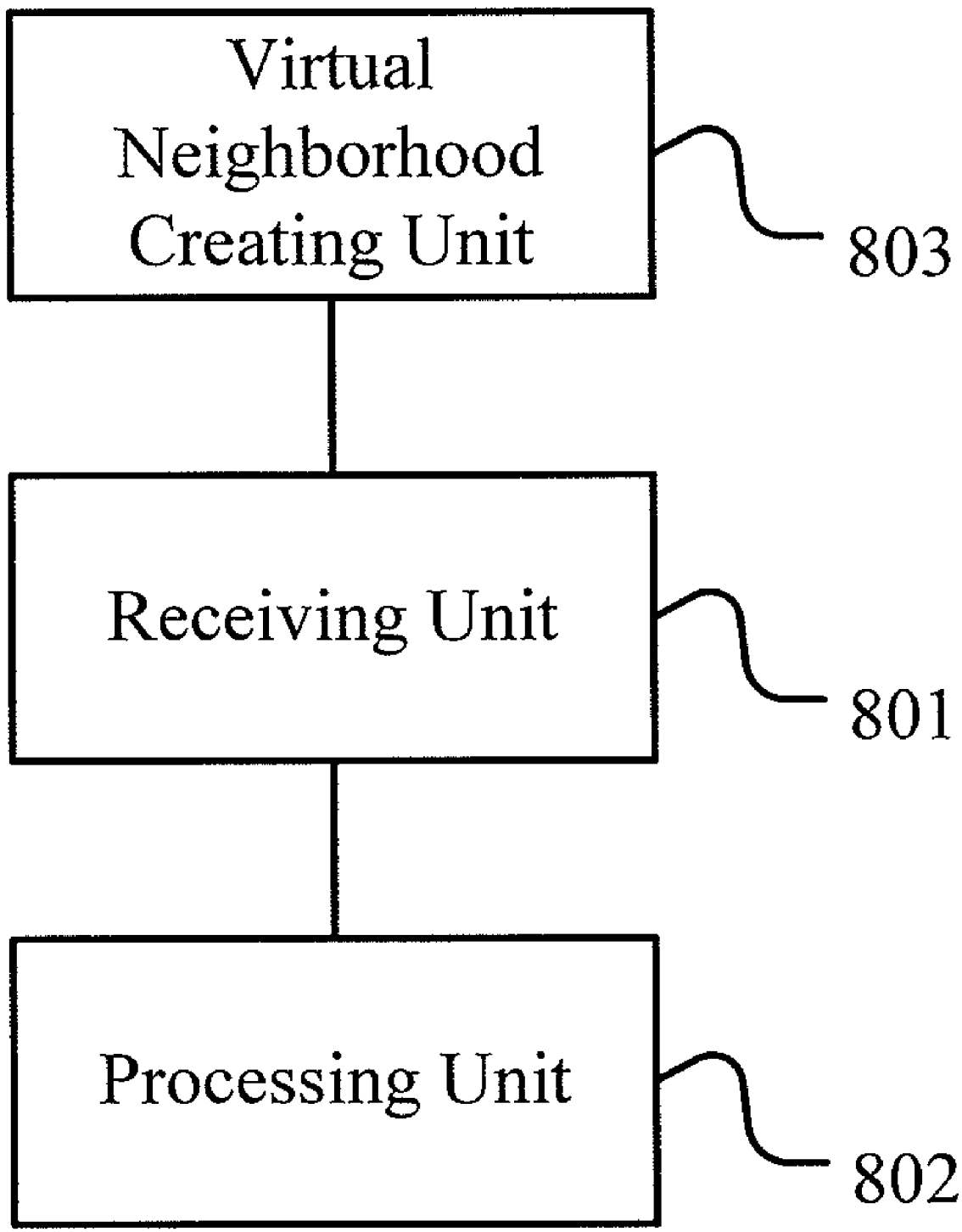
FIG. 8 is a schematic view illustrating the structure of the SMB in the router, in accordance with an embodiment of the disclosure.

As shown in FIG. 8, it is a schematic view illustrating the structure of the SMB in the router, according to an embodiment of the disclosure.

The SMB includes a receiving unit 801, a processing unit 802, and a virtual neighborhood creating unit 803.

The receiving unit 801 is adapted to receive the LSA message sent by the LC or the AMB as the virtual neighbor, which has established virtual neighborhood. The processing unit 802 is adapted to obtain the LSDB and the relationship between the interface state and neighbor state stored in the LC from the virtual neighbor LC, when a switching occurs and the SMB becomes the new AMB. The virtual neighborhood creating unit 803 is adapted to create a virtual interface and establish the virtual neighborhood with the LC and AMB 503 via the virtual interface.

After the switching occurs, because the interface state and the neighbor state are stored in the LC, the switching of AMBs will not cause any change for the neighbor state on the LC. When the SMB becomes the new AMB, the processing unit 802 of the SMB may directly obtain the interface state and neighbor state on each LC and then perform routing calculation once according to the LSDB, and update the routing table.

In a word, the technical solution of embodiments of the disclosure is: receiving a LSA message; comparing the LSA message with a LSA in an LSDB; when it recognizes that the received LSA message is a new message by comparing, updating the LSA message in the LSDB and transmitting the received LSA message to a virtual neighbor which has already established virtual neighborhood. In the technical solution of embodiments of the disclosure, the virtual neighborhood has already been established between component units in the router and the LSDB has been distributedly stored. After receiving the LSA message, a step of comparing with the stored LSA message is added. Only when it is recognized by comparing that the received LSA message is a new LSA message, will the LSA message be sent to the virtual neighbor which has established virtual neighborhood. Therefore, the synchronization of the LSDB is simply implemented by adopting the LSDB synchronization mechanism of the OSPF protocol's own, and which greatly reduces the amount of message flow inside the router.

Furthermore, because the LSDB is stored on the LC, no matter in the process of establishing the virtual neighbor or in the process of synchronizing the LSDB, the AMB needs to participate in the processing only when a LSA message newer than that on the LC is processed or a newer LSA message is required. After receiving the same or the old LSA message or a request, the LSA message can be processed independently on the LC without participation of the AMB.

In addition, if switching occurs, the SMB is taken as a new AMB and the LC takes the new AMB as the DR. Because each of LCs stores the LSDB respectively, after switching, the new AMB may be able to directly obtain the LSDBs on all the LCs. Besides, because the interface state and the neighbor state are stored in the LC, the switching of AMBs will not cause any change for the neighbor state on the LC so that the new AMB may directly obtain the interface state and the neighbor state on each LC. Therefore, the new AMB implements synchronization of the switched LSDB, according to the LSDB and relationship between the interface state and the neighbor state on the LC obtained from the LC. Furthermore, when a new LC is inserted, it may be implemented to support more neighbors.

Finally, it should be understood that the above embodiments are only used to explain, but not to limit the technical solution of the disclosure. Despite the detailed description of the disclosure with referring to above preferred embodiments, it should be understood that various modifications, changes or equivalent replacements can be made by those skilled in the art without departing from the spirit and scope of the disclosure and covered in the claims of the disclosure.

What is claimed is:

1. A method for implementing synchronization of link state database (LSDB), comprising:
    receiving a link state advertisement (LSA) message; and
    comparing the LSA message with an LSA message in a LSDB, updating the LSA message in the LSDB when recognizing that the LSA message received is a new message by comparing, and transmitting the LSA message received to a virtual neighbor which has established a virtual neighborhood; wherein the establishment of the virtual neighborhood further comprises:
    creating a virtual interface among an active master board (AMB), a standby master board (SMB), and a line card (LC); and
    establishing the virtual neighborhood via the virtual interface, wherein establishing the virtual neighborhood via the virtual interface comprises at least one of the following steps:
        according to device management information, transmitting the LSA message mutually between the AMB, the SMB and the LC via the virtual interface, and creating the virtual neighborhood, according to the LSA message received; and
        after transmitting a neighbor discovery message and a database description message mutually between the AMB, the SMB, and the LC via the virtual interface, transmitting the LSA message mutually, and creating the virtual neighborhood, according to the LSA message received.

2. The method according to claim 1, wherein the comparing the LSA message with the LSA message in the LSDB comprises: comparing according to a sequence number, checksum or age of the LSA message, correspondingly the LSA message with a big comparison result being the new message.

3. The method according to claim 1, wherein the SMB becomes a new AMB when a switching occurs, and the new AMB obtains from the LC the LSDB and a relationship between an interface state and a neighbor state stored in the LC.

4. The method according to claim 1, wherein receiving the LSA message specifically comprises: receiving, by the LC, the LSA message; correspondingly,
    the LC compares the LSA message received with the LSA message in the LSDB, updates the LSA message in the LSDB when recognizing that the LSA message received is a new message by comparing, transmits the LSA message received to the AMB and the SMB if the LSA message received comes from an outer router, and transmits the LSA message received to the AMB and the outer router if the LSA message received comes from the AMB; and
    the LC transmits the LSA message in the LSDB to the outer router when recognizing that the LSA message received is an old message by comparing, and returns an ACK message to a transmitting party when recognizing that the LSA message received is the same message by comparing.

5. The method according to claim 1, wherein receiving the LSA message specifically comprises: receiving, by the AMB, the LSA message sent by the LC; correspondingly,
    the AMB compares the LSA message received with the LSA message in the LSDB, updates the LSA message in the LSDB when recognizing that the LSA message received is a new message by comparing, and transmits the LSA message received to the SMB and other LCs except the LC of the transmitting party; and
    the AMB transmits the LSA message in the LSDB to the LC of the transmitting party when recognizing that the LSA message received is an old message by comparing, and returns an ACK message to the LC of the transmitting party when recognizing that the LSA message received is the same message by comparing.

6. The method according to claim 5, wherein transmitting the LSA message to the LC specifically comprises:
    adding the LSA message into a retransmission queue of the corresponding LC and transmitting the LSA message to the LC; deleting the LSA message in the retransmission queue if the returned ACK message is received; and if no returned ACK message is received, retransmitting the LSA message in the retransmission queue after a retransmission timer expires.

7. A router, comprising:

a line card (LC) adapted to receive a state advertisement (LSA) message, compare the LSA message received with a LSA message in a link state database (LSDB), update the LSA message in the LSDB when recognizing the LSA message received is a new message by comparing, and transmit the LSA message received to an active master board (AMB) and a standby master board (SMB);

the AMB adapted to receive the LSA message sent by the LC, compare the LSA message received with the LSA message in the LSDB, update the LSA message in the LSDB when recognizing that the LSA message received is a new message by comparing, and transmit the LSA message received to the SMB and other LCs except the LC of a transmitting party; and the SMB adapted to receive the LSA message sent by the LC or the AMB which has established a virtual neighborhood; and wherein the LC comprises:

a comparing unit adapted to compare the LSA message received with the LSA message in the LSDB after receiving the LSA message;

a first processing unit adapted to update the LSA message in the LSDB when the comparing unit recognizes that the LSA message received is a new message by comparing, transmit the LSA message received to the AMB and the SMB if the LSA message received comes from an outer router, and transmit the LSA message received to the AMB and the outer router if the LSA message received comes from the AMB;

a second processing unit adapted to transmit the LSA message in the LSDB to the outer router when the comparing unit recognizes that the LSA message received is an old message by comparing;

a third processing unit adapted to return an ACK message to the transmitting party, when the comparing unit recognizes that the LSA message received is the same message by comparing; and a virtual neighborhood creating unit adapted to create a virtual interface and establish the virtual neighborhood with the AMB and the SMB via the virtual interface.

8. The router according to claim 7, wherein transmitting, by the first processing unit of the LC, the LSA message received to the AMB and the SMB specifically comprises:

adding the LSA message received into a retransmission queue of the corresponding AMB and SMB; transmitting the LSA message to the AMB and the SMB in a way of multi-broadcasting; if the ACK message is returned, deleting the LSA message in the retransmission queue; and if the ACK message is not returned, retransmitting the LSA message in the retransmission queue in a way of unicasting after a retransmission timer expires.

9. The router according to claim 7, wherein the AMB comprises:

a comparing unit adapted to compare the LSA message received with the LSA message in the LSDB, after receiving the LSA message sent by the LC;

a first processing unit adapted to update the LSA message in the LSDB when the comparing unit recognizes that the LSA message received is a new message by comparing, and transmit the LSA message received to the SMB and other LCs, except the LC of the transmitting party;

a second processing unit adapted to transmit the LSA message in the LSDB to the LC of the transmitting party, when the comparing unit recognizes that the LSA message received is an old message by comparing;

a third processing unit adapted to return an ACK message to the LC of the transmitting party when the comparing unit recognizes that the LSA message received is the same message by comparing; and a virtual neighborhood creating unit adapted to create a virtual interface and establish the virtual neighborhood with the LC and the SMB via the virtual interface.

10. The router according to claim 9, wherein the AMB further comprises: a generating unit adapted to generate the LSA message and transmit the LSA message generated to the SMB and all the LCs;

transmitting the LSA message to the LCs specifically comprises: adding the LSA message into the retransmission queue of the corresponding LC, transmitting the LSA message to the LC; if the returned ACK message is received, deleting the LSA message in the retransmission queue; and if no returned ACK message is received, retransmitting the LSA message in the retransmission queue after a retransmission timer expires.

11. The router according to claim 7, wherein the SMB comprises:

a receiving unit adapted to receive the LSA message sent by the LC or the AMB which has established the virtual neighborhood;

a processing unit adapted to obtain from the LC the LSDB and the relationship between the interface state and the neighbor state stored in the LC when a switching occurs and the SMB becomes a new AMB; and a virtual neighborhood creating unit adapted to create a virtual interface and establish the virtual neighborhood with the LC and the AMB via the virtual interface.

12. A line card (LC), comprising:

a comparing unit adapted to compare the LSA message received with the LSA message in the LSDB after receiving the LSA message;

a first processing unit adapted to update the LSA message in the LSDB when the comparing unit recognizes that the LSA message received is a new message by comparing, transmit the LSA message received to the AMB and the SMB if the LSA message received comes from an outer router, and transmit the LSA message received to the AMB and the outer router if the LSA message received comes from the AMB;

a second processing unit adapted to transmit the LSA message in the LSDB to the outer router when the comparing unit recognizes that the LSA message received is an old message by comparing;

a third processing unit adapted to return an ACK message to the transmitting party when the comparing unit recognizes that the LSA message received is the same message by comparing; and a virtual neighborhood creating unit adapted to create a virtual interface and establish the virtual neighborhood with the AMB and the SMB via the virtual interface.

13. An active master board (AMB), comprising:

a comparing unit adapted to compare the LSA message received with the LSA message in the LSDB after receiving the LSA message sent by the LC;

a first processing unit adapted to update the LSA message in the LSDB when the comparing unit recognizes that the LSA message received is a new message by comparing, and transmit the LSA message received to the SMB and other LCs except the LC of the transmitting party;

a second processing unit adapted to transmit the LSA message in the LSDB to the LC of the transmitting party when the comparing unit recognizes that the LSA message received is an old message by comparing;

a third processing unit adapted to return an ACK message to the LC of the transmitting party when the comparing unit recognizes that the LSA message received is the same message by comparing; and a virtual neighborhood creating unit adapted to create a virtual interface and establish the virtual neighborhood with the LC and the SMB via the virtual interface.

* * * * *